(12) United States Patent
Fabian

(10) Patent No.: US 7,128,268 B1
(45) Date of Patent: Oct. 31, 2006

(54) BAR CODE SCANNER HAVING A MIRRORED SPINNER WHICH OPERATES AT DIFFERENT SPEEDS

(75) Inventor: Kenneth J. Fabian, Grayson, GA (US)

(73) Assignee: NCR Corporation, Dayton, OH (US)

( * ) Notice: Subject to any disclaimer, the term of this patent is extended or adjusted under 35 U.S.C. 154(b) by 0 days.

(21) Appl. No.: 10/700,889

(22) Filed: Nov. 4, 2003

(51) Int. Cl.
G02B 26/00 (2006.01)

(52) U.S. Cl. .............................. 235/462.4; 235/462.38; 235/462.39

(58) Field of Classification Search ........... 235/462.01, 235/462.09, 462.33, 462.36, 462.38, 462.39, 235/462.4
See application file for complete search history.

(56) References Cited

U.S. PATENT DOCUMENTS

| | | | | |
|---|---|---|---|---|
| 4,795,224 A | * | 1/1989 | Goto | 359/211 |
| 5,010,242 A | * | 4/1991 | Frontino | 235/462.39 |
| 5,132,524 A | * | 7/1992 | Singh et al. | 235/462.39 |
| 5,266,787 A | * | 11/1993 | Mazz et al. | 235/462.25 |
| 5,280,162 A | * | 1/1994 | Marwin | 235/462.31 |
| 5,298,729 A | * | 3/1994 | Wike, Jr. | 235/462.22 |
| 5,510,605 A | * | 4/1996 | Miyazaki | 235/462.4 |
| 5,600,120 A | * | 2/1997 | Peng | 235/462.39 |
| 5,663,550 A | * | 9/1997 | Peng | 235/462.39 |
| 5,910,651 A | * | 6/1999 | Ryvkin | 235/462.25 |
| 6,390,369 B1 | * | 5/2002 | Tang et al. | 235/462.4 |

* cited by examiner

Primary Examiner—Ahshik Kim
(74) Attorney, Agent, or Firm—Paul W. Martin

(57) ABSTRACT

A bar code scanner has a housing including a surface having a transparent scanning window. The housing contains optical components including a spinner and pattern mirrors arranged to produce sets of scan lines. The spinner is operable at two, substantially constant, non-zero spin speeds.

16 Claims, 5 Drawing Sheets

BAR CODE SCANNER HAVING A MIRRORED SPINNER WHICH OPERATES AT DIFFERENT SPEEDS

BACKGROUND OF THE INVENTION

Conventional bar codes have varying width bars and spaces suitably printed on a label. The bar code may take any conventional form in one or more dimensions, and includes, for example, the typical one-dimensional UPC form. The UPC symbology is based on a specification enacted by the Uniform Product Code Council, Inc. of Dayton, Ohio. The typical UPC bar code includes a series or sequence of alternating dark bars and light spaces of varying widths. The bars and spaces are arranged in groups representing individual characters. The bar code starts with a left margin character and ends with a right margin character, and has a center reference character as well, with the characters provided there between representing any desired data.

Scanners, such as the NCR® 7882 model horizontal scanner, produced by NCR Corporation of Dayton, Ohio, USA, scan those lines by causing a laser beam to be repeatedly passed across the scan lines. The path of the laser beam is determined by a mirrored spinner, which is itself rotated by a motor. The manner in which lines are scanned will be described in detail below. However, a problem arises with this scanning, especially in store environments, where the noise of the motor can cause a nuisance to operators and customers alike.

In addition, in order to save power the spinner is stopped between scans, after a specific down time. However, this leads to an additional problem, that a scan can then not be performed until the spinner is run back up to scanning speed. This can take a few seconds to achieve and any such delay can cause inconvenience to customers waiting the scanning of goods they wish to purchase.

Another problem with prior art scanners is that they depend on motion or other sensors to determine if a bar code is present adjacent the scanner before powering up the spinner in order to scan the bar code. However, not all motion adjacent the scanner is necessarily a bar code to be scanned and thus the spinner can be powered up unnecessarily, which again cause both noise and unnecessary power consumption.

It is an object of the present invention to produce a bar code scanner, which obviates one or more of the problems discussed above.

SUMMARY OF THE INVENTION

According to a first aspect of the present invention there is provided a bar code scanner having optical components including a spinner and pattern mirrors arranged to produce sets of scan lines, the spinner being operable at two, substantially constant, non-zero spin speeds.

Preferably, a single motor powers the spinner, which is operable at said two non-zero spin speeds.

Preferably, the bar code scanner of claim 1, further comprises a control means arranged to control the speed of operation of the spinner.

Preferably, the speeds of operation of the scanner are full speed and half speed.

Preferably, the full speed is within the range of approximately 8,000 rpm to 10,000 rpm and half speed is within the corresponding range of approximately 4,000 rpm to 5,000 rpm. Other spin speeds can be envisaged. However, speeds in these ranges have been found to be particularly effective.

Preferably, the control means controls the speed of rotation of the spinner such as to switch from said full speed to said half speed if the scanner has not detected the presence of a bar code for a predetermined period of time.

Preferably, said predetermined period of time is 5 minutes.

Preferably, the scanner is operated in order to scan bar codes, for a predetermined time, at said half speed, and is only switched to said full speed when said time period is exceeded.

Preferably, said predetermined time period is 30 seconds.

Preferably, the spinner has a plurality of mirrored facets, each of the facets being mounted at a different angle to the axis of rotation of the motor.

According to a second aspect of the present invention there is provided a method of operating a bar code scanner having optical components including a spinner and pattern mirrors arranged to produce sets of scan lines, the method including operating the spinner at one or other of two, substantially constant, non-zero spin speeds dependent on the scanning activity required of the scanner at that time.

According to a third aspect of the present invention there is provided a method of operating a bar code scanner, wherein spinner speed is varied depending on activity at the scanner and wherein when there is no scanning or motion near the scanner for an extended time period the spinner is halted, when motion is detected in the area of the scanner the spinner is operated at low speed and if tag segments are seen the spinner speed is changes to high speed and when at high speed, if no tag data is seen in a predetermined time the spinner is switches back to low speed.

According to a fourth aspect of the present invention there is provided a method of operating a bar code scanner, wherein the motor speed is varied depending on activity at the scanner such that, when there is no scanning or motion near the scanner for an extended time period the spinner is turned to a low speed and if tag segments are seen the spinner is changed to a high speed.

An advantage of a bar code scanner in accordance with the present invention is that the scanner is quieter than prior art scanners of a comparable size. An additional advantage of the scanner in accordance with the present invention is that it scans at two non-zero speeds, in other words a low speed and a high speed.

Part of the inventive nature of this invention stems from the realization that the majority of the noise created by the scanner is caused in two ways. Initially noise is created by the spin up process in which the spinner speed is increased from zero to operating speed (normally of the order of 8000 rpm to 10,000 rpm) and secondly, from the continued running of the scanner at high speeds even when scanning is not being undertaken.

DESCRIPTION OF THE DRAWINGS

The invention, in accordance with preferred and exemplary embodiments, together with further objects and advantages thereof, is more particularly described in the following detailed description taken in conjunction with the accompanying drawings, in which.

DESCRIPTION OF THE PREFERRED EMBODIMENT

Figure 1:
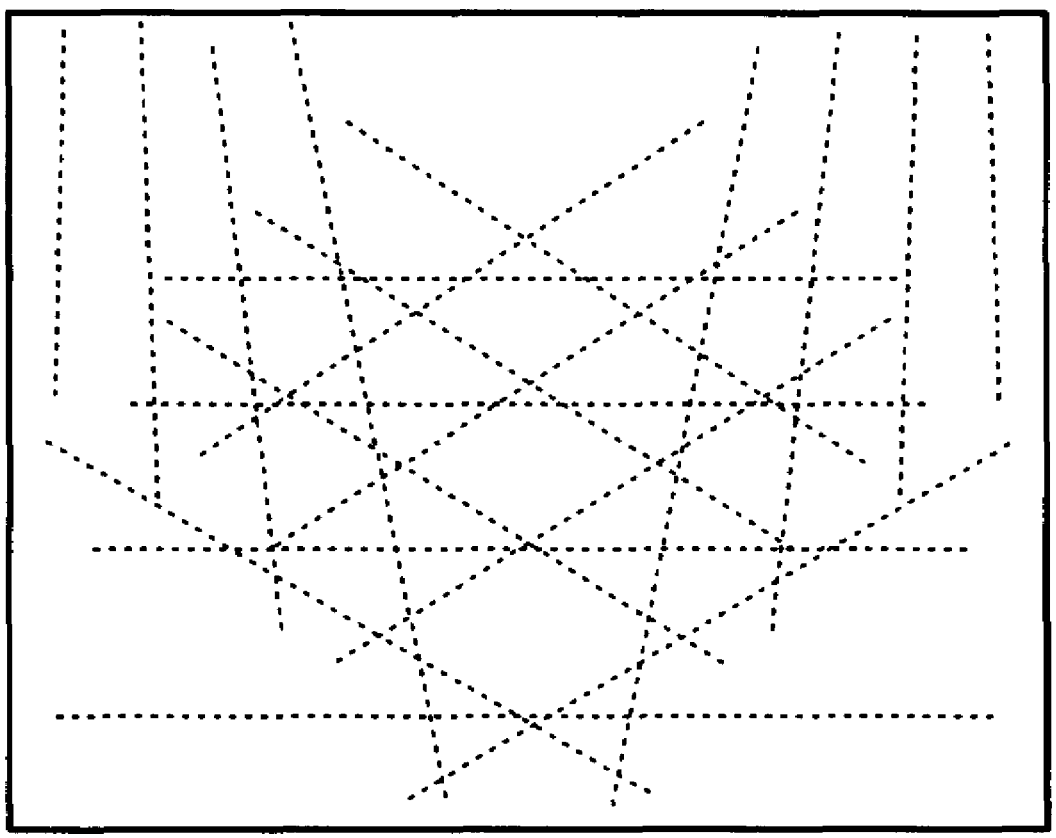
FIG. 1 illustrates a typical scan pattern for a scanner of a comparable size to a scanner in accordance with the present invention.
Figure 2:
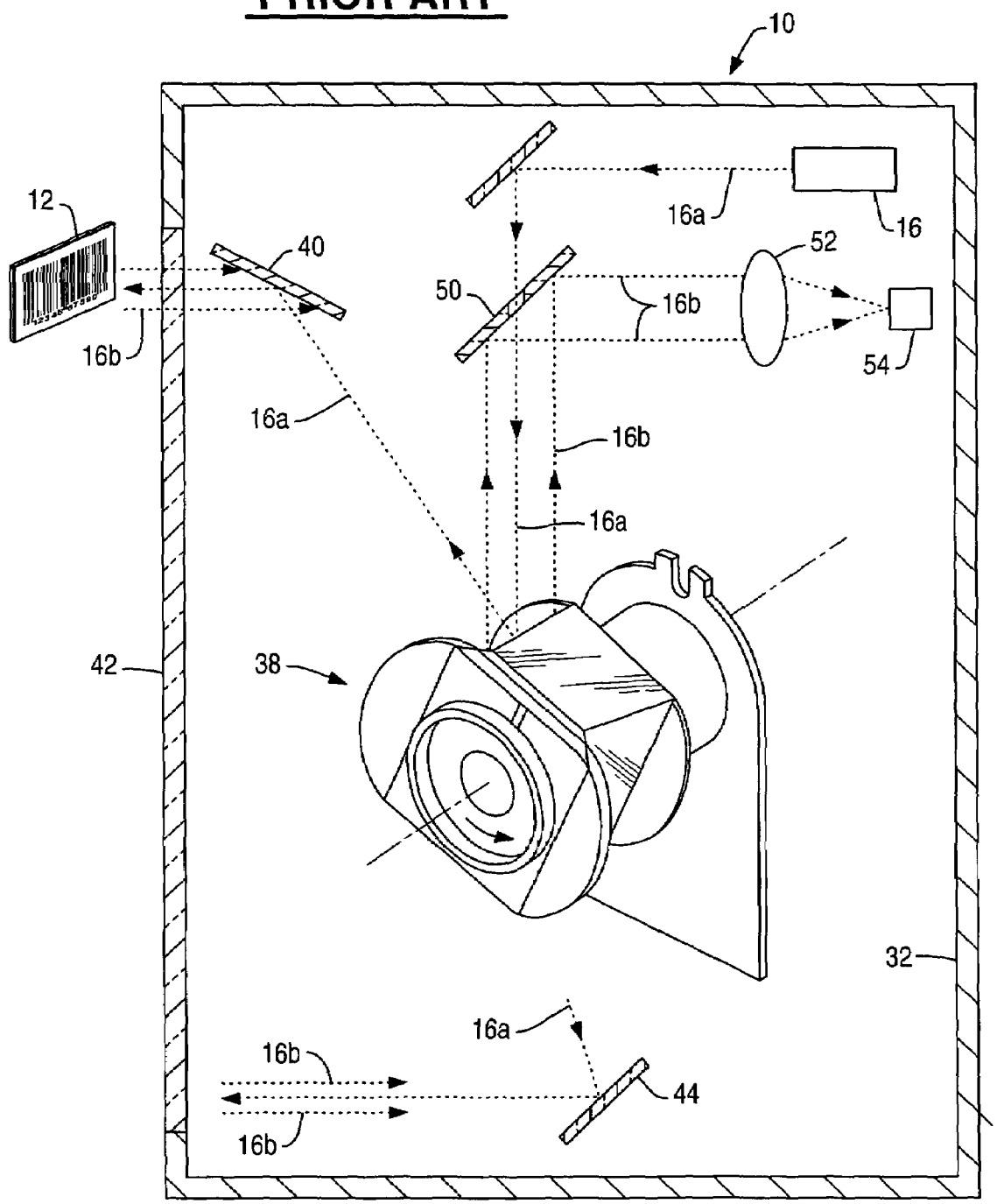
FIG. 2 is a schematic representation of an optical arrangement of a bar code scanner in accordance with the present invention.

Prior to discussing the operation of the spinner at two spin speeds the general operation of a scanner will be described. FIG. 2 illustrates the optical arrangement of a bar code scanner 10. The scanner includes a housing 32 in which its various operating components are suitably mounted.

A laser 16, typically in the form of a laser diode, is mounted in the housing for emitting an outbound laser beam 16a. A rotary spinner 38 is suitably disposed in the outbound optical beam path with the laser 16 for segmenting the beam in corresponding optical paths in alignment with a plurality of primary pattern mirrors 40 which reflect corresponding scan lines out a transparent window 42 of the scanner 10. The scan lines may be produced from direct reflection between the spinner and the primary pattern mirrors, or secondary pattern mirrors 44 may be optically aligned with corresponding ones of the primary pattern mirrors to produce the desired scan line pattern emitted through the scanning window 42.

The pattern mirrors may be oriented in the scanner housing 32 in any conventional manner for producing the desired scan line pattern for each revolution of the spinner 38. In this way, a conventional barcode 12 may be positioned in front of the window 42 for being traversed by any one or more of the scan lines in the pattern for returning reflected light 16b therefrom inbound in the opposite direction for collection by the pattern mirrors 40, 44 and rotating spinner 38 for decoding.

A suitable collection mirror 50 is suitably optically aligned between the laser 16 and the spinner 38, and may include a center aperture therein, through which the outbound scan beam 16a passes without obstruction. Since the reflected light 16b is diffuse from being reflected off the barcode 12, the pattern mirrors, spinner, and collection mirror 50 are suitably sized in area for collecting sufficient reflected light 16b for use in decoding the barcode.

The reflected or collection light 16b is reflected from the collection mirror 50 and focused through a suitable focusing lens 52 onto a conventional photodetector 54 which produces a corresponding electrical signal which is decoded in the electrical controller of the scanner in a conventional manner.

Figure 3:
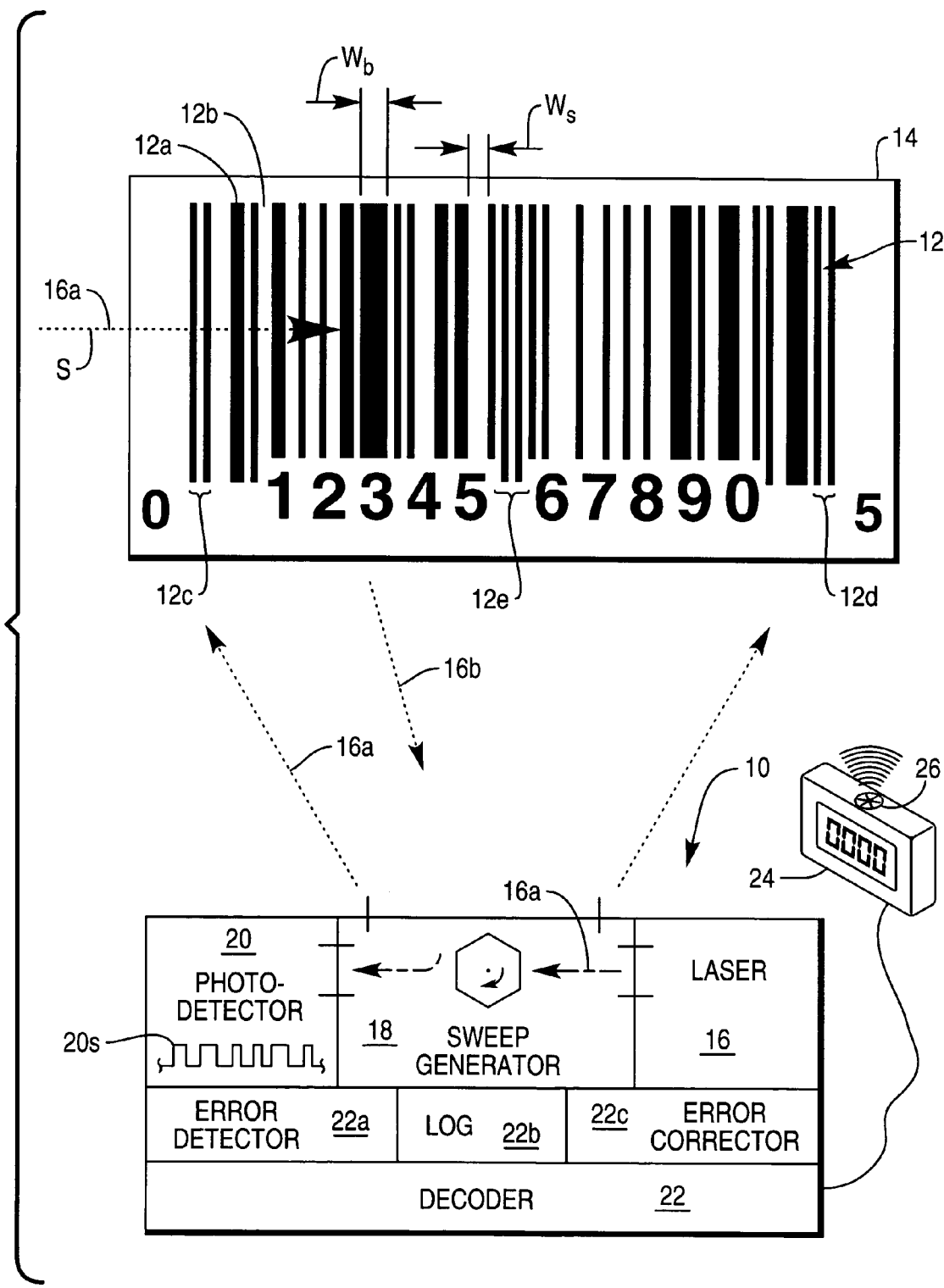
FIG. 3 is a schematic representation of a bar code scanner in accordance with the present invention.

Illustrated schematically in FIG. 3 is a laser bar code scanner 10 for scanning and decoding a conventional bar code 12 printed on a suitable label 14. The bar code 12 may take any conventional form in one or more dimensions including the conventional one-dimensional UPC symbology illustrated. The exemplary bar code 12 illustrated in FIG. 3 includes a plurality of sequential or alternating dark bars 12a and white spaces 12b, which are straight and parallel to each other and have corresponding varying widths W.sub.b and W.sub.s. The bars and spaces are arranged in a plurality of sequential groups defining respective characters of equal width. The minimum with of a bar or a space is defined as the minimum width module, and in the UPC symbology must exceed 9 mils by specification. A single UPC character is defined as having two bars 12a and two spaces 12b of varying widths. And, the specified widths of a single character coded using the UPC symbology must, by specification, be seven modules. Furthermore, the UPC symbology defines the maximum bar width as being four modules.

In the exemplary bar code 12 illustrated in FIG. 3, the bar code conventionally starts with a left margin character 12c, ends with a right margin character 12d, and has a center reference character 12d, with the remaining bars and spaces there between defining desired data characters. As indicated above, each of the data characters has a total width of seven modules and includes two bars and two spaces.

The exemplary scanner 10 illustrated in FIG. 3 includes conventional means for optically scanning the bar code 12 sequentially across the bars and spaces 12a,b over the total width of the bar code 12 from the left margin character 12c to the right margin character 12d. In the preferred embodiment illustrated, scanning is accomplished by using a conventional laser 16 which emits a suitable laser beam 16a which is suitably scanned across the face of the bar code 12 by a conventional sweep generator 18 which may take the form of a rotating multifaceted mirror 38. The laser beam 16a is scanned transversely across the bar code 12 in a scan direction S so that back scattered light 16b reflects off the bars and spaces back to the scanner. Since the bars 12a are dark, very little light is back scattered therefrom, whereas the spaces 12b are substantially white and more effectively backscatter light to the scanner.

A conventional photodetector 20 is provided in the scanner 10 and is suitably optically aligned therein for receiving the back scattered light 16b and producing an electrical bar code signature 20s alternating in intensity between maximum and minimum values corresponding with the back scattered light 16b from the spaces 12b and bars 12a, respectively. The time duration of the maximum and minimum intensity portions of the signature 20s corresponds with the varying widths of the bars and spaces. Since the scan beam 16a is scanned across the bar code 12 at a known and constant rate of speed, the bar code signature 20s is representative of the bar code 12 itself and may be decoded in a conventional decoder 22 specifically configured for the corresponding bar code symbology printed on the label 14.

The decoder 22 may take any conventional form and is typically a digitally programmable microprocessor containing suitable software for analyzing the bar code signature 20s and decoding the data contained therein. The scanner 10 is electrically joined to a suitable display 24 which may be used for displaying certain information encoded in the bar code 12, such as the price of a consumer product represented thereby. When the bar code 12 is accurately scanned and decoded, the data may be presented on the display 24, and a small speaker 26 operatively joined to the scanner 10 may beep to indicate successful decoding of the bar code 12.

Now turning to the operation of the scanner at two speeds. There are a number of means by which the spinner speed can be altered. For example, two motors can be provided with attached spinners. Alternatively, a single motor can be arranged to run at high speed under normal conditions and at low speed when appropriate.

One can provide what amounts to two sets of scanner electronic circuits on the same board with a communication bridge circuit there between. One of these circuits is designates as master and has an attached EEPROM for storing configuration data. The motor speed output to each of these motors is set high or low by a micro-controller based on the value of a bit in the masters EEPROM.

As well as the use of, for example, a DC brushless motor with a digital input that switches the motor between low speed and high speed a different motor could be used which operated at multiple speeds or even variable speed.

Scanner firmware can be arranged to set the motor to low or high speed at power up based on a bit set in an EEPROM. For sites where noise is an issue, when the motor is on it is can always be set to start at said low speed. Firmware can also be used to switch the motor speed on a dynamic basis.

Two possible modes of controlling the motor speed follow.

Figure 4:
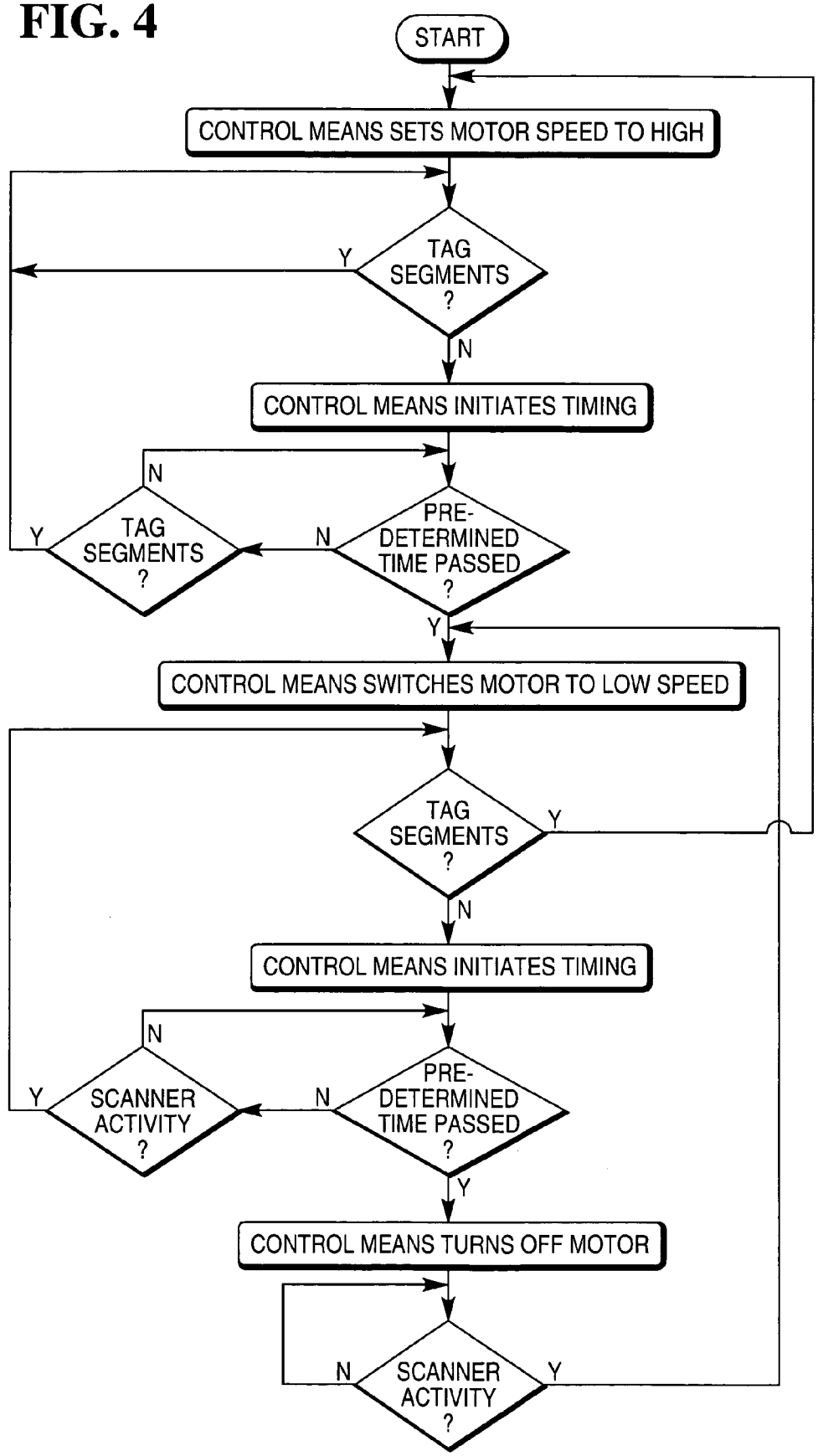
FIG. 4 is a flow diagram illustrating operation of the first mode.

Mode 1 (FIG. 4): (Two Speed Motor Speed With No-Activity Shutoff)

Motor speed again varies depending on activity at the scanner. When there is no scanning or motion near the scanner for an extended time period, say 5 minutes, the motor is turned off. If motion is seen in the area of the scanner the motor goes to low speed. If tag segments are seen the motor changes to high speed. When at high speed, if no tag data is seen in, say a 30 second period, the motor switches back to low speed.

Figure 5:
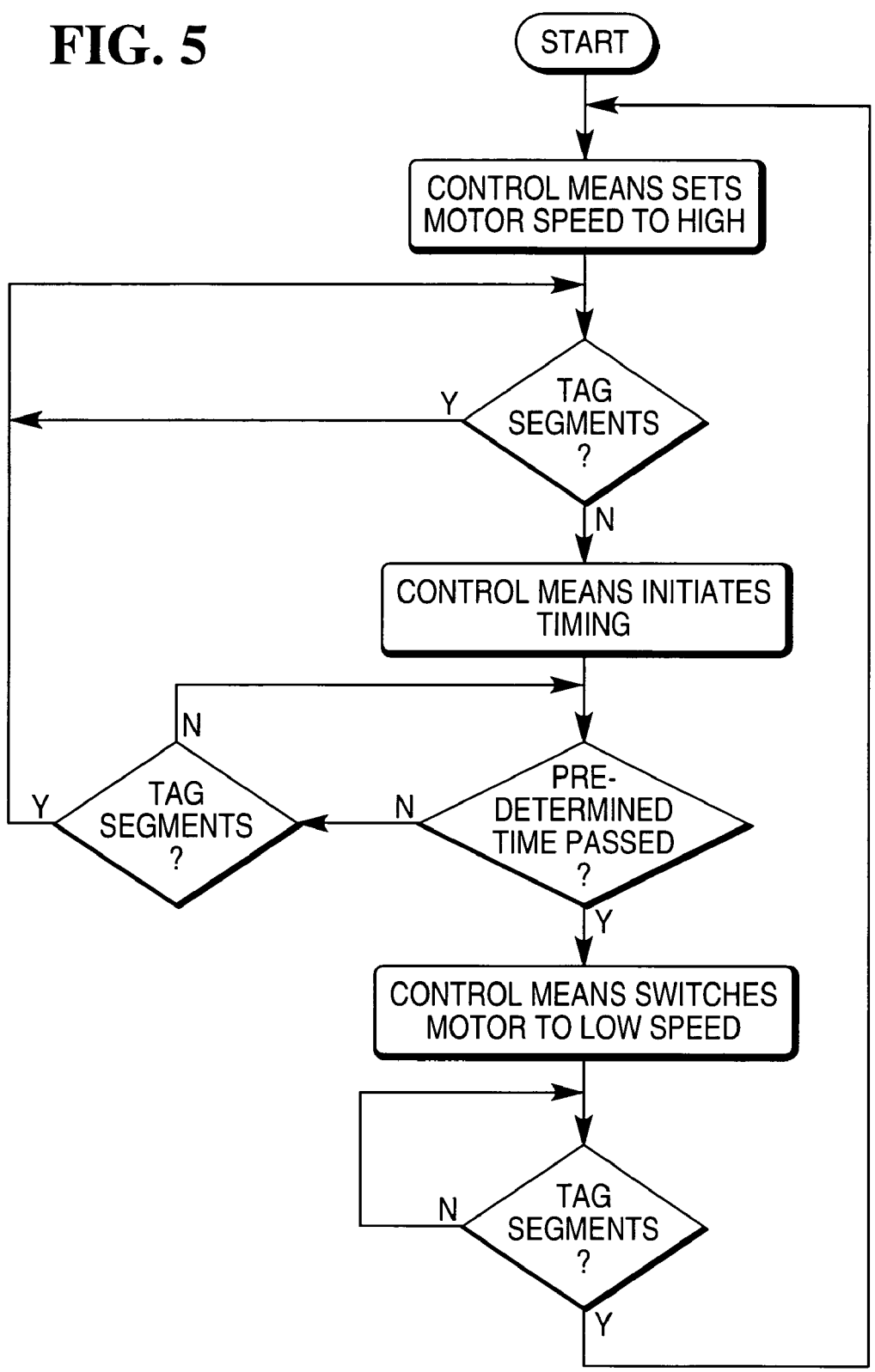
FIG. 5 is a flow diagram illustrating operation of the second mode.

Mode 2 (FIG. 5): (Two Speed Motor without Shutoff)

Motor speed varies depending on activity at the scanner. When there is no scanning or motion near the scanner for an extended time period, say 5 minutes, the motor is turned to low speed. If tag segments are seen the motor changes to high speed.

This application would be best for customers who want the best performance from the scanner, but still want a higher reliability, lower power product. It is particularly of value in a self-checkout environment where the individual scanning the tags knows little or nothing about scanners. Switching the motor to low speed doubles the life of the motor, cuts the motor power by 75% and lowers the audible noise from the scanner.

The times used above are examples of the values that might be used and are typically programmable based on a customer site.

The foregoing description of the preferred embodiment of the invention has been presented for the purposes of illustration and description. It is not intended to be exhaustive or to limit the invention to the precise form disclosed. Many modifications and variations are possible in light of the above teaching.

I claim:

1. A bar code scanner comprising:
   a mirrored spinner for directing a laser beam towards a plurality of stationary pattern mirrors and for directing received light;
   a motor for rotating the mirrored spinner;
   a detector for converting the received light into electrical signals;
   decoding circuitry for decoding bar code information from the electrical signals; and
   control circuitry for switching operation of the motor between a first non-zero speed and a second non-zero speed about half the first non-zero speed based upon amounts of the bar code information received in predetermined periods of time;
   wherein the first non-zero speed is about 8,000 rpm to 10,000 rpm, and wherein the second non-zero speed is about 4,000 rpm to 5,000 rpm.

2. The bar code scanner of claim 1, wherein the control circuitry switches from the first non-zero speed to the second non-zero speed if the control circuitry has not detected the bar code information for a first predetermined period of time.

3. The bar code scanner of claim 2, wherein the first predetermined time comprises about 5 minutes.

4. The bar code scanner of claim 3, wherein the control circuitry turns off the motor if the control circuitry has not detected the bar code information for a second predetermined period of time.

5. The bar code scanner of claim 2, wherein the control circuitry switches from the second non-zero speed to the first non-zero speed if the control circuitry has detected bar code information for more than a second predetermined time period.

6. The bar code scanner of claim 5, wherein said second predetermined time period comprises 30 seconds.

7. The bar code scanner of claim 1, wherein the mirrored spinner comprises a plurality of mirrored facets, each of the facets being mounted at a different angle to an axis of rotation of the motor.

8. A scanning method comprising:
   a) directing a laser beam towards a plurality of stationary pattern mirrors and directing received light from the stationary pattern mirrors;
   b) rotating the mirrored spinner by a motor;
   c) converting the received light into electrical signals by a detector;
   d) decoding bar code information from the electrical signals by decoding circuitry; and
   e) switching operation of the motor between a first non-zero speed and a second non-zero speed about half the first non-zero speed based upon amounts of the bar code information received in predetermined periods of time by control circuitry;
   wherein the first non-zero speed is about 8,000 rpm to 10,000 rpm, and wherein the second non-zero speed is about 4,000 rpm to 5,000 rpm.

9. The method of claim 8, wherein step e) comprises:
   e-1) failing to detect the bar code information for a first predetermined period of time by the control circuitry; and
   e-2) switching from the first non-zero speed to the second non-zero speed by the control circuitry.

10. The method of claim 9, wherein the first predetermined time comprises about 5 minutes.

11. The method of claim 9, wherein step e) further comprises:
    e-3) failing to detect the bar code information for a second predetermined period of time by the control circuitry; and
    e-4) turning off the motor by the control circuitry.

12. The method of claim 9, wherein step e) further comprises:
    e-3) detecting the bar code information for more than a second predetermined period of time by the control circuitry; and
    e-4) switching from the second non-zero speed to the first non-zero speed by the control circuitry.

13. The method of claim 12, wherein said second predetermined time period comprises 30 seconds.

14. A scanning method comprising:
    a) directing a laser beam towards a plurality of stationary pattern mirrors and directing received light from the stationary pattern mirrors;
    b) rotating the mirrored spinner by a motor;
    c) converting the received light into electrical signals by a detector;
    d) decoding bar code information from the electrical signals by decoding circuitry; and e) changing motor speed based upon amounts of the bar code information received in predetermined periods of time by control circuitry, including switching the motor speed from a first non-zero speed to a second non-zero speed lower than the first non-zero speed if the control circuitry has not detected the bar code information for a first predetermined period of time;

turning off the motor if the control circuitry has not detected the bar code information for a second predetermined period of time;

turning on the motor and operating it at the second non-zero speed if the control circuitry receives a signal from a motion sensor; and switching from the second non-zero speed to the first non-zero speed if the control circuitry has detected bar code information for more than a third predetermined time period.

15. A bar code scanner comprising:

a mirrored spinner for directing a laser beam towards a plurality of stationary pattern mirrors and for directing received light;

a motor for rotating the mirrored spinner;

a detector for converting the received light into electrical signals;

decoding circuitry for decoding bar code information from the electrical signals; and control circuitry for switching operation of the motor between a first non-zero speed and a second non-zero speed lower than the first non-zero speed based upon amounts of the bar code information received in predetermined periods of time;

wherein the control circuitry switches from the first non-zero speed to the second non-zero speed if the control circuitry has not detected the bar code information for a first predetermined period of time; and wherein the control circuitry switches from the second non-zero speed to the first non-zero speed if the control circuitry has detected bar code information for more than a second predetermined time period of about 30 seconds.

16. A scanning method comprising:

a) directing a laser beam towards a plurality of stationary pattern mirrors and directing received light from the stationary pattern mirrors;

b) rotating the mirrored spinner by a motor;

c) converting the received light into electrical signals by a detector;

d) decoding bar code information from the electrical signals by decoding circuitry; and e) switching operation of the motor between a first non-zero speed and a second non-zero speed lower than the first non-zero speed based upon amounts of the bar code information received in predetermined periods of time by control circuitry, including e-1) failing to detect the bar code information for a first predetermined period of time by the control circuitry;

e-2) switching from the first non-zero speed to the second non-zero speed by the control circuitry;

e-3) detecting the bar code information for more than a second predetermined period of time of about 30 seconds by the control circuitry; and e-4) switching from the second non-zero speed to the first non-zero speed by the control circuitry.

* * * * *